Dec. 4, 1962 B. MÖLLER 3,066,647
MOBILE PIGEON STARTING APPARATUS AND LOFT
Filed Oct. 24, 1960 5 Sheets-Sheet 2
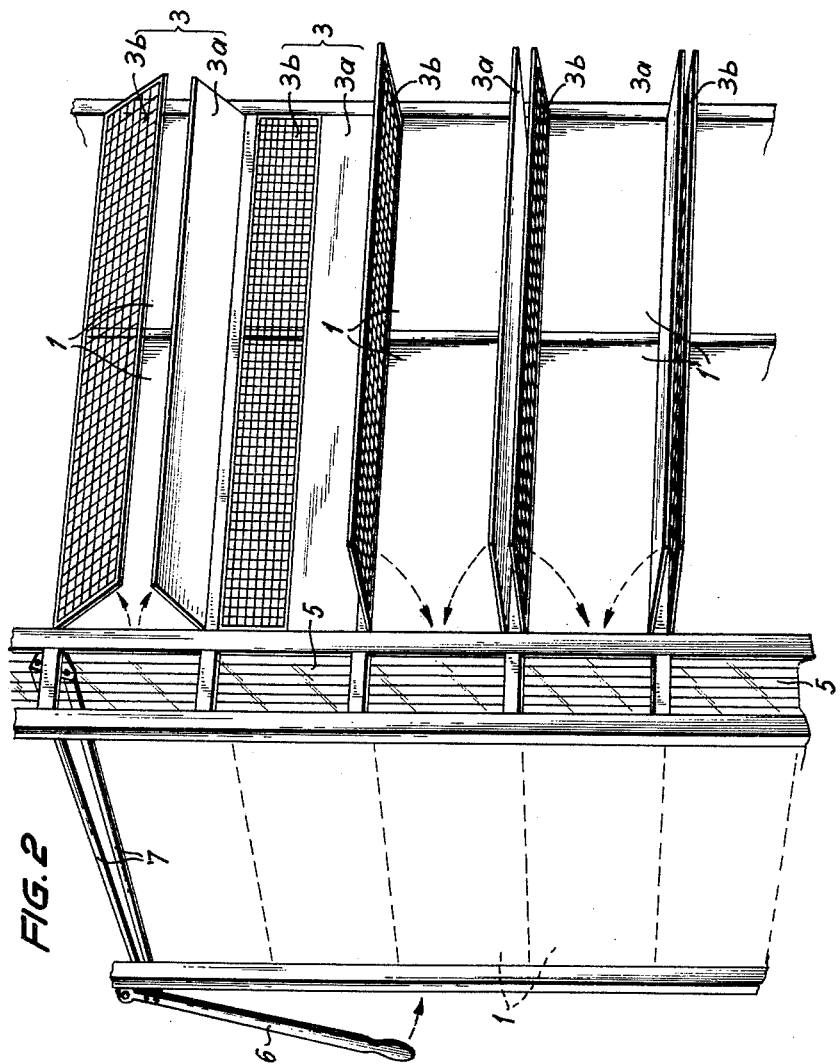
INVENTOR

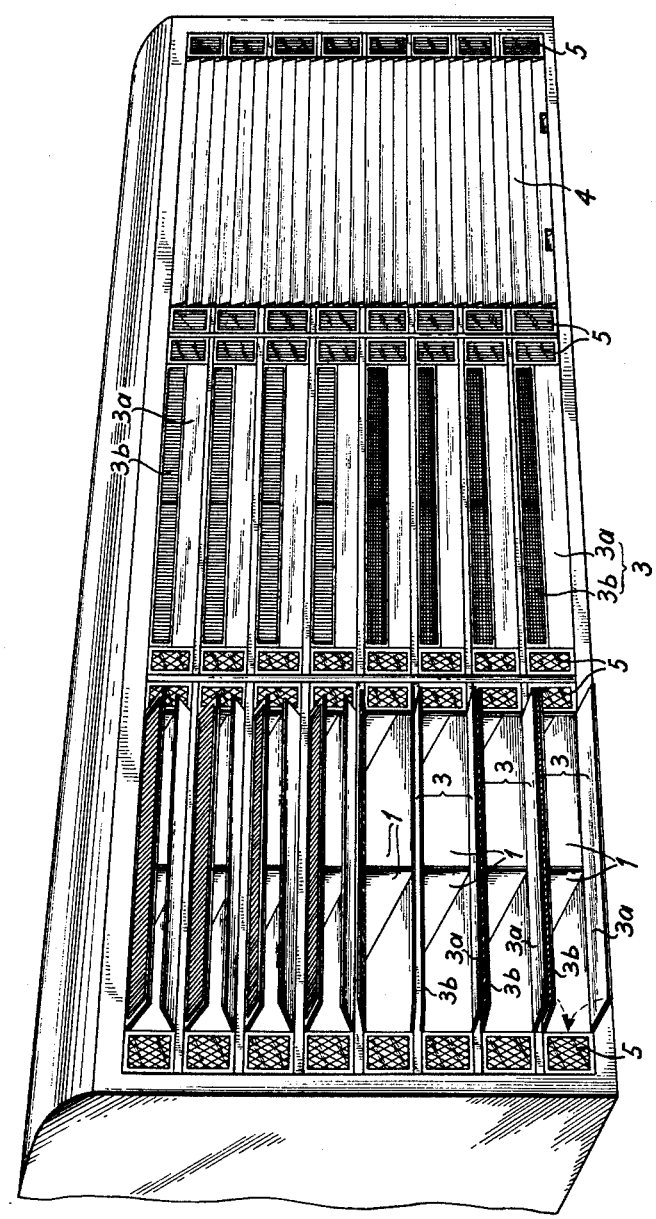

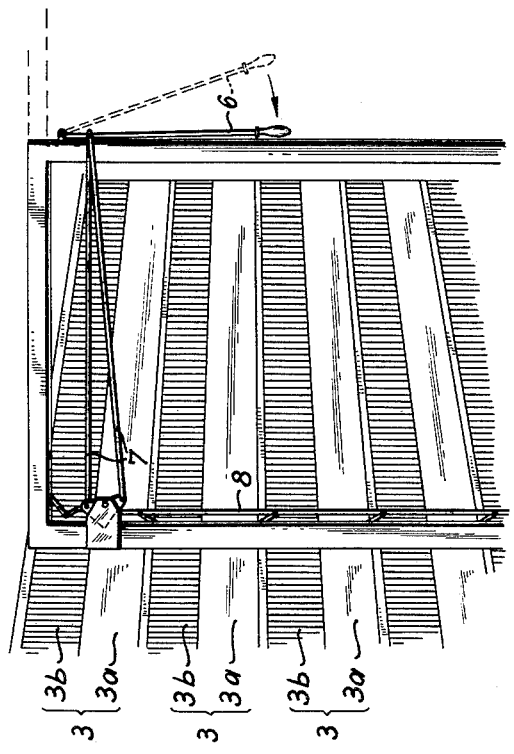

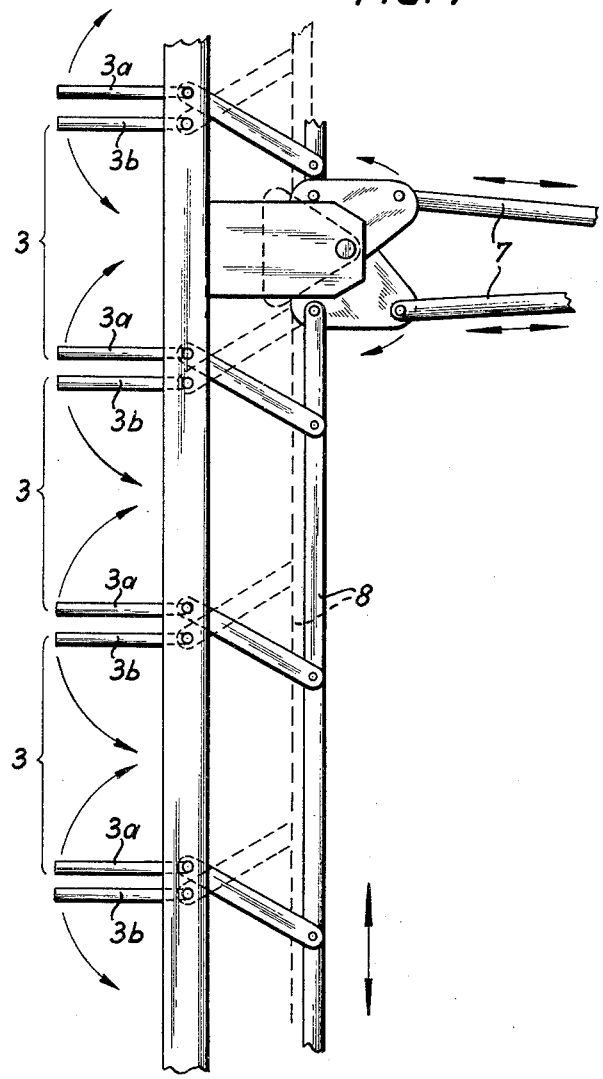

Dec. 4, 1962   B. MÖLLER   3,066,647
MOBILE PIGEON STARTING APPARATUS AND LOFT
Filed Oct. 24, 1960   5 Sheets-Sheet 5
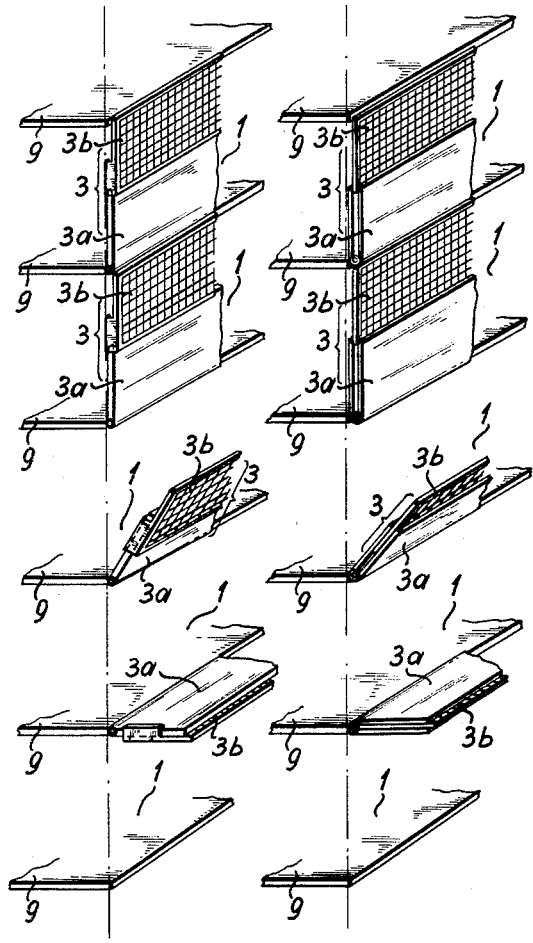
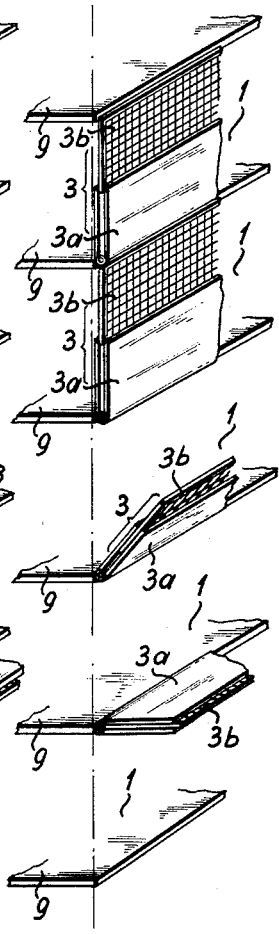
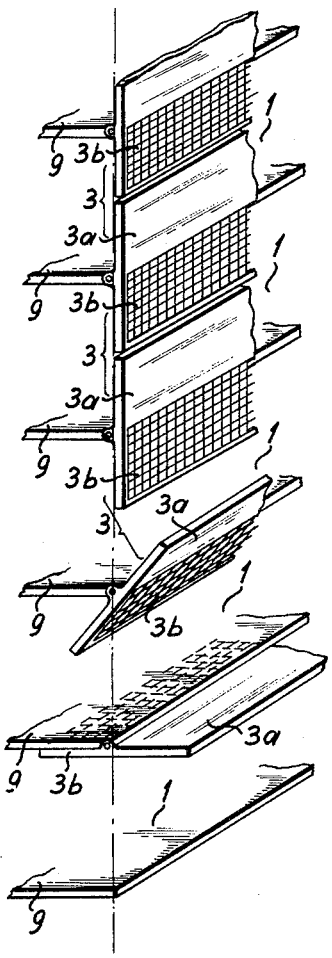
INVENTOR

United States Patent Office 3,066,647
Patented Dec. 4, 1962

3,066,647
MOBILE PIGEON STARTING APPARATUS
AND LOFT
Bernhard Möller, 6 Schützenstrasse, Salzkotten,
Westphalia, Germany
Filed Oct. 24, 1960, Ser. No. 64,323
Claims priority, application Germany Oct. 30, 1959
17 Claims. (Cl. 119—15)

This invention relates to a travelling loft for carrier pigeons in the form of a combined transport and starting apparatus, the walls of which consist of a multiplicity of tiered individual boxes or cages opening outwardly, at one vertical side for receiving and discharging pigeons engaged in public tournaments or competitions. The cages may be closed in a draught-tight manner by external closure means, e.g. roller blinds consisting of a flexibly connected sequence of individual horizontal slats which may be drawn from a storage place above the boxes or cages outwardly and downwardly over the individual box openings to cover the same in such draught-tight manner. In this connection it is known art to arrange drop shutters between the roller blinds and the openings of the pigeon boxes, the said drop shutters forming protective flaps for protecting the pigeons from injury by the roller blinds, and also acting as starting flaps for releasing the pigeons. It has already been proposed to make these intermediate flaps of a lattice type or to make them of wire mesh in order to render possible satisfactory ventilation of the combined portable housing and starting apparatus, for example where the apparatus is loaded with several thousand competition flight pigeons and is at a standstill, by raising partly or even completely lifting the outer roller blind away from covering disposition of the box or cage openings.

It has been found that when the drop shutters are made of lattice bars many pigeons hesitate to leave the cage after the drop shutters have dropped down, as in their home loft they are accustomed to find on arrival outside the cage an alighting and take-off board. The drop flaps are therefore made as a rule of heavy material and separate ventilation gratings are arranged in addition, which can be made so as to serve at the same time as insertion flaps for inserting the pigeons in the cages or compartments.

Such ventilation gratings arranged next to the starting flaps however mean that the width of the starting flaps is reduced, for which reason it has already been proposed to arrange the ventilation system not next to the starting flaps, but directly in them. By such a combination of the arrangements for starting the pigeons and for ventilating the boxes, i.e. by the solid starting flaps being fitted with suitable ventilating devices, the starting flaps may be made wider, so that there is much more room free for the outward flight of the birds when racing. This is of great importance for accomplishing the simultaneous start of the racing pigeons which is always sought.

In the invention the transportable housing and starting apparatus equipped with starting flaps is further fitted out in a suitable manner, so that important simplifications in construction are made possible, with extremely good ventilation and lighting of the pigeon boxes especially when halted. Furthermore an advantageous mode of opening the starting flaps is provided to let the pigeons out.

According to the invention the new carrier pigeon travelling loft, in which in known manner exterior ventilating devices and movable starting flaps for releasing the pigeons are closed in a draught-tight manner by means of common outer covering closure means, preferably roller blinds, is characterised in that the starting flaps consist of two horizontal strips, the lower strip of which is made essentially solid and serves as a taking-off board as the pigeons fly out, while the other, upper, strip is made air-permeable for the purpose of ventilating the pigeons compartments.

From this basic idea of the invention alone considerable advantages are obtained. It has been found, that is to say, that the upper air-permeable starting flap strip, which as a rule forms the upper half of the starting flap and extends at head height of the racing pigeons in the individual boxes, provides an excellent air supply for all the pigeons in the boxes when the outer roller blind is itself ventilated or drawn fully up and away from covering disposition over the cage openings, and moreover, admits light in a satisfactory manner over the whole width of the pigeon boxes. It has also been found that the lower solid starting flap strip, which as a rule forms the lower half of the starting flap and when swung out acts as an alighting board, acts at the same time as a protection against litter. This is true since the sawdust or shavings strewn in the pigeon compartments cannot drop out as a result of the pigeons scratching and cannot be blown away if in hot weather ventilated outer roller blinds are used during the journey to the starting point.

The nature of the constructional arrangement and the manner in which the opening operates in accordance with the invention can be chosen so as to suit the circumstances. For example, the lower solid flap strip of an upper pigeon compartment, acting as a take-off board, may be in one piece with the upper ventilating strip of the pigeon compartment lying below and can be supported at the floor between them as a swing flap. It is however preferable in the usual manner to have lower articulated starting flaps divided in two horizontally at the line of separation of the take-off strip and ventilation strip, providing various possibi ities for the ccns.ruction and opening arrangements of the starting flaps. Thus the upper ventilating strip may be moved during the opening process into or next to the lower hollow or solid take-off strip to avoid the pigeons having to pass, as they fly away, over the ventilating strip of the grating type, for instance.

According to a particularly advantageous further development of the invention the horizontally divided starting flaps are formed as twin flaps, in such a way that the lower flap strip acting as a take-off strip can be swung down while the upper flap strip used for the ventilation can be swung up. In this connection a lever mechanism e.g. in the form of a parallel-bar or lazy tongs arrangement can be provided for the simultaneous swinging down of the take-off board and swinging up of the ventilation strip.

So that the pigeons cannot slip as they emerge from the cage for flight, the lower flap strip acting as a take-off board is preferably made from a material with a rough surface, or its side acting as a take-off surface is preferably covered with a material offering a good grip or with a hardboard sheet with a rough upper surface. The upper flap strip used for ventilation may consist of a grating or a frame over which is stretched wire netting or fine mesh wire fabric, or it may consist of a perforated sheet.

Specific embodiments of the invention will now be described by way of example with reference to the accompanying drawings, which diagrammatically represent a carrier pigeon travelling loft, which here has roller blinds and starting flaps as outer common closure means and starting means respectively. In the drawings:

FIGURE 1 is a side view in perspective of a carrier pigeon travelling loft, the walls of which consist of tiered individual boxes for accommodating the pigeons and which possesses outwardly opening starting flaps, which are shown partly open.

FIGURE 2 represents on a larger scale and in perspective details of the construction of the travelling loft of FIGURE 1 with two-part twin starting flaps horizontally centrally divided in the various stages of opening, FIGURE 3 shows, viewed from the interior of the left, a lever mechanism for the simultaneous downward swinging of the take-off board and upward swinging of the ventilating strip, the intermediate floor and intermediate walls of the boxes being omitted for the sake of greater clearness.

FIGURE 4 shows on a larger scale the details and mode of action of the lever mechanism of FIGURE 3, and FIGURES 5 to 7 represent various modifications of the starting flaps in the various stages of opening.

As shown in FIGURES 1 and 2 the carrier pigeon travelling loft in accordance with the invention essentially consists of a number of individual boxes 1 for receiving the racing pigeons, arranged above and beside one another at the longitudinal sides and front. The double boxes 1 here chosen form the loft walls and may be removed within a space (not shown) for servicing purposes for the pigeon handler. Common outer closure means are provided in the form of roller blinds 4, which can be actuated from the inner servicing chamber and are shown drawn up in the two subsections on the left hand part of FIGURE 1. Between the roller blinds 4 and the pigeon box openings are arranged flaps 3, forming on the one hand protective flaps protecting the pigeons from being hurt by the roller blinds and on the other hand forming starting flaps for the simultaneous release of the thousands of racing pigeons in the individual boxes 1. In FIGURE 2 is shown a hand lever 6 which, via a lever mechanism 7, can effect the simultaneous opening of the starting flaps 3. Narrow vertical lighting strips 5 are disposed between the roller blinds 4, which strips in the embodiment shown consist of grating type insert flaps with window panes arranged in front of them and which can be lifted up and removed.

In each double box 1 the starting flaps 3 consist of two horizontal strips 3a and 3b. In the embodiment shown in FIGURES 1 and 2 the starting flap 3 is divided in two at the dividing line of the two strips 3a and 3b, so that the strips 3a and 3b are individually movable. The strip 3a placed in the lower part of the box opening, hereinafter termed the "lower strip," is made essentially solid and when swung down in the opening position, when the pigeons are to be released, acts as a take-off board for them. The strip 3b in the upper part of the box opening, hereinafter termed the "upper" strip, is made air-permeable and provides proper ventilation for the pigeon boxes 1 when the roller blind 4 is ventilated or drawn up, particularly when the travelling pigeon loft is at a standstill and situated for use. In FIGURE 1 the upper strip 3b consists partly of a narow barred grating and partly of a frame over which is stretched mosquito netting, while in FIGURE 2 a narrow-mesh wire gauze is used. When the roller blind 4 is ventilated or drawn up light can be admitted at the same time through the upper ventilating strip 3b, so that the pigeon boxes can be well lighted over their whole width in addition to the lighting provided by the vertical lighting strips 5. The upper sides of the dropped lower strips 3a acting as take-off surfaces are covered with a material offering a good grip, in this case a hardboard sheet (not shown), which is rivetted on to the strip 3a with its rough side upwards, so that it is impossible for the pigeons to slip as they take off from the box 1.

As shown in FIGURES 3 and 4 the starting flaps 3, horizontally divided in two, here in each case into two separate take-off and ventilating strips 3a and 3b, can be opened and closed by means of a hand lever 6. The hand lever 6 actuates a lever mechanism 7, consisting of a parallel bar system 8 and is suitably made so that the flap strips 3a and 3b open or close when the lever 6 is pulled or pressed. The operating mechanism actuates the flap strips 3a and 3b in such a way that in the opening operation the flap strips 3a swing downwards and the flap strips 3b swing upwards.

In the modification shown in FIGURE 5 the starting flaps 3 are likewise each divided into a lower take-off strip 3a and an upper lighting strip 3b, but the grating type ventilating strip 3b is moved by means of a suitable mechanism during the opening of the starting flap 3 along the outside of the solid take-off strip 3a, so that in the "opened" position it comes to rest below this strip 3a.

In the modification shown in FIGURE 6 the lower take-off strip 3a is made hollow in the form of a pocket, so that the grating type ventilating strip 3b can be inserted therein by means of a suitable mechanism during the opening of the starting flap 3.

In the modification shown in FIGURE 7 the "lower" take-off strip 3a is united with the "upper" ventilating strip 3b of the box aperture located thereunder, to form a swivel flap centrally supported at the box floor. Thus, when the starting flap is opened the grating type ventilating strip 3b comes to rest below the box floor 9.

I claim:

1. Carrier pigeon travelling loft in the form of a combined transport and starting apparatus for public pigeon tournaments and pigeon air races which comprises means defining an enclosure having top, side, and bottom walls and means defining an opening therein for releasing pigeons for racing, the opening means being provided with means defining a pair of closure flaps including an upper air-permeable ventilation flap and a lower solid wall take-off flap, and mechanical activating means connected to the ventilation flap and take-off flap providing simultaneous motion for moving said flaps from a position substantially completely closing said opening means to a position substantially completely opening said opening means, said take-off flap when in opening position being in a horizontal plane extending adjacent said opening means and defining a pigeon take-off platform.

2. Apparatus according to claim 1 wherein the enclosure means has an opening means of rectangular configuration situated in a vertical plane and includes a horizontal top edge, a horizontal bottom edge and a pair of opposing side edges, said upper flap being rectangular in configuration and when in closing position extending across substantially the upper half of the rectangular opening means and the lower flap being rectangular in configuration and when in closing position extending across substantially the lower half of the rectangular opening means whereby to close substantially completely said opening means, said lower flap when in opening position forming an outward horizontal extension of said bottom edge.

3. Apparatus according to claim 2 wherein said upper flap is pivoted for movement about a horizontal axis substantially coinciding with said closing means top edge and said lower flap is pivoted for movement about a horizontal axis substantially coinciding with said bottom edge for movement together from a closing position in said vertical plane outwardly to an opening position in which each said flap is in a horizontal plane extending from the respective edge perpendicular substantially to said vertical plane.

4. Apparatus according to claim 2 wherein said lower flap has a lower horizontal pivot end and an upper horizontal free end, said lower flap being pivoted along said pivot end for movement about a horizontal axis substantially coinciding with said opening means bottom edge, and said upper flap is slidably disposed on said lower flap for movement from a retracted horizontal opening position overlapping the underside of the lower flap when said lower flap is in horizontal opening position to an extended vertical closing position adjacent to and upwardly extending from said lower flap free end when said lower flap is in vertical closing position, said upper flap and lower flap in closing position extending vertically across said rectangular opening means to substantially completely close said opening means.

5. Apparatus according to claim 2 wherein said lower flap has a lower horizontal pivot end and an upper horizontal free end, said lower flap being pivoted along said pivot end for movement about a horizontal axis substantially coinciding with said opening means bottom edge, and said upper flap is slidably disposed in a medial recess in the plane of said lower flap and extending from said free end toward said pivot end, said upper flap being movable from a retracted horizontal opening position substantially completely within said recess when said lower flap is in horizontal opening position to an extended vertical closing position adjacent to and upwardly extending from said lower flap free end when said lower flap is in vertical closing position, said upper flap and lower flap in closing position extending vertically across said rectangular opening means to substantially completely close said opening means.

6. Apparatus according to claim 2 wherein a plurality of horizontally disposed enclosure means is provided in stacked relation one above the other, each said enclosure means having an opening means of rectangular configuration and an upper and lower flap of rectangular configuration, each lower flap having a lower horizontal pivot end and an upper horizontal free end, each said lower flap being pivoted along said pivot end for movement about a horizontal axis substantially coinciding with said opening means bottom edge, and each upper flap having an upper horizontal pivot end and a lower horizontal free end, each said upper flap being pivoted along said pivot end for movement about a horizontal axis substantially coinciding with said opening means top edge, each said upper flap being connected at the pivot end thereof with the corresponding pivot end of the next adjacent lower flap situated in stacked relation thereabove for movement together therewith about a common axis therebetween coinciding with both the bottom edge of the next higher opening means and the top edge of the opening means immediately below said next higher opening means from a common horizontal opening position opening the lower portion of the next higher opening means situated thereabove and the upper portion of the opening means immediately below said next higher opening means to a common vertical closing position closing the lower portion of the next higher opening means situated thereabove and the upper portion of the opening means immediately below said next higher opening means.

7. Apparatus according to claim 1 wherein the take-off flap defining the take-off platform is provided with a non-slip friction surface.

8. Apparatus according to claim 7 wherein said surface is provided in the form of a rough hard board sheet.

9. Apparatus according to claim 1 wherein the ventilation flap consists of a bar type grating.

10. Apparatus according to claim 1 wherein the ventilation flap consists of a frame having wire mesh stretched thereover.

11. Apparatus according to claim 1 wherein the ventilation flap consists of a perforated plate.

12. Apparatus according to claim 1 wherein a plurality of said enclosure means is provided in stacked relation superimposed one above the other, each said enclosure means having an opening means, an upper ventilation flap and a lower take-off flap, and mechanical activating means connected to the upper flaps and the lower flaps providing simultaneous motion for moving said flaps from a position substantially completely closing said opening means, to a position substantially completely opening said opening means, each said lower flap when in opening position being in a horizontal plane extending adjacent the corresponding opening means and defining a pigeon take-off platform.

13. Apparatus according to claim 12 wherein a lever mechanism is provided for the simultaneous downward swinging of the lower take-off flaps and for the simultaneous upward swinging of the upper ventilation flaps to open said opening means.

14. Apparatus according to claim 13 wherein said lever mechanism is a parallel rod mechanism.

15. Apparatus according to claim 13 wherein said lever mechanism is a lazy tongs type mechanism.

16. Apparatus according to claim 12 wherein an overall outer common closure means is provided movable from an opening position remote from the flaps to a closing position over the flaps of each enclosure means to outwardly cover said flaps in a draft-tight manner.

17. A carrier pigeon traveling loft in the form of a combined transport and starting apparatus for public pigeon tournaments and pigeon air races, the walls of which apparatus are formed by tiered individual boxes opening outwardly, for accommodating the carrier pigeons for racing, in which connection the individual boxes have exterior ventilating devices and also movable starting flaps for releasing the carrier pigeons for racing, which are outwardly closable in a draft-tight manner by overall outer common closure means movable from an opening position to a closing position over the flaps, characterized in that the starting openings of the individual boxes are closed by sets of starting flaps, each set being constructed as twin flap consisting of two horizontal individual plaques of which the lower plaque is made substantially solid for acting as a take-off board as the pigeons are released, while the other, upper plaque is made air-permeable for the purpose of ventilating the pigeon boxes, said plaques of each twin flap being turnable horizontally in such a way that the lower plaque acting as a take-off board can be swung down and the upper plaque used for ventilation can be swung up, swivelling lever mechanism connected to end portions of the flaps including an operating mechanism actuating said twin flaps by simultaneous downward swinging of the take-off boards and upward swinging of the ventilating plaques to open said boxes for releasing the pigeons for racing.

References Cited in the file of this patent

UNITED STATES PATENTS

| | | |
|---|---|---|
| 693,901 | Portman | Feb. 25, 1902 |
| 2,733,427 | Chandler | Jan. 31, 1956 |

FOREIGN PATENTS

| | | |
|---|---|---|
| 149,926 | Switzerland | Dec. 1, 1931 |